United States Patent [19]
Klug et al.

[11] Patent Number: 5,996,007
[45] Date of Patent: Nov. 30, 1999

[54] METHOD FOR PROVIDING SELECTED CONTENT DURING WAITING TIME OF AN INTERNET SESSION

[75] Inventors: John R. Klug; Noah H. Klug, both of Evergreen, Colo.

[73] Assignee: John Klug, Evergreen, Colo.

[21] Appl. No.: 08/876,765

[22] Filed: Jun. 16, 1997

[51] Int. Cl.[6] .............................. G06F 13/14; G06F 13/00
[52] U.S. Cl. ............................................ 709/218; 707/501
[58] Field of Search ..................... 395/200.47, 200.48, 395/200.31, 200.33, 200.6, 200.76, 557, 200.49; 709/201, 203, 217, 218, 219, 230, 246

[56] References Cited

U.S. PATENT DOCUMENTS

| 5,515,490 | 5/1996 | Buchanan et al. | 395/154 |
| 5,572,643 | 11/1996 | Judson | 395/200.48 |
| 5,657,450 | 8/1997 | Rao et al. | 395/610 |
| 5,768,508 | 6/1998 | Eikeland | 395/200.32 |
| 5,787,254 | 7/1998 | Maddalozzo, Jr. et al. | 395/200.58 |
| 5,794,210 | 8/1998 | Goldhaber et al. | 705/14 |
| 5,805,815 | 9/1998 | Hill | 395/200.48 |
| 5,809,242 | 9/1998 | Shaw et al. | 395/200.47 |

OTHER PUBLICATIONS

Hill, G. Christian, May 27, 1997, *Wall Street Journal*, Group of Firms Propose Standard For Privacy on Net, 2 pages.
Internet Pathfinder, E–Mail News Web—Business News, Internet Leaders to Offer Privacy Protection, 2 pages.
Internet, Netscape, Firefly and VeriSign Propose Open Profiling Standard (OPS) to Enable Broad Personalization of Internet Services, 3 pages.

*Primary Examiner*—Mark H. Rinehart
*Assistant Examiner*—Marc D Thompson
*Attorney, Agent, or Firm*—Holme Roberts & Owen LLP

[57] ABSTRACT

Selected content such as product information and announcements is provided during waiting time of an Internet session. In one implementation, the process implemented by the waiting time message program of the invention involves monitoring (416) a user node to identify a web site access request, accessing (418) a previously stored message set, selecting (432) a message from the message set and displaying or playing back (434) the selected message. The message set and particular messages may be selected based on user information (e.g., demographic, psychographic, or product preference information), information regarding the expected waiting time or other information. Messages are thereby provided during waiting time that would otherwise be essentially wasted from the perspective of an ordinary Internet user, e.g., during processing time associated with the exchange of information between Internet content providers and Internet content users.

28 Claims, 4 Drawing Sheets

METHOD FOR PROVIDING SELECTED CONTENT DURING WAITING TIME OF AN INTERNET SESSION

FIELD OF THE INVENTION

The present invention relates in general to interactive communication networks such as the internet or other public or private networks (generically the "Internet") and, in particular, to providing selected content during interval and/or dead time ("waiting time") of an Internet session, e.g., during processing time associated with the exchange of information between the Internet content providers and Internet content users.

BACKGROUND OF THE INVENTION

In recent years, public participation in the Internet has expanded at a rate that has, at times, surprised industry analysts and service providers. This expansion has not escaped the attention of the business community who is actively searching for ways to capitalize on this medium of everincreasing importance. In the attempt to quickly respond to this phenomenon, the business community and its promotional and advertising consultants have sometimes analogized the Internet to more familiar media in order to analyze business opportunities and apply accumulated experience and wisdom to the unfamiliar and poorly understood new medium. In this regard, some have viewed the Internet as a form of electronic publishing and have focused on printed media as an instructive business paradigm. Others, focusing on the dynamic voice and image potential of Internet communications, have viewed broadcast media as the most instructive source of business experience.

A result of this current tendency to analyze business opportunities on the Internet in view of experiences with more familiar media is that initial advertising efforts on the Internet have closely resembled traditional advertisements in appearance, format and function. Among the most common Internet advertisements are so-called banner advertisements. These advertisements typically appear in high traffic areas such as the home page of a browser, search engine or web site, and appear to the user as an area or banner occupying a portion of the monitor working area or graphical desktop. These banners are typically designed much like advertisements in the printed media using wellestablished principles intended to draw attention away from the primary content to the banner and maximize public response. Others have proposed video or audiovisual commercials in the television style. Such commercials, as in television, would interrupt and be interspersed with the flow of information over the Internet.

Such approaches have not proved effective. The television style advertisement proposals have met great resistance and, in general, have not been implemented by wary service providers. Banner advertisements have also been quite limited in effectiveness. As a result, an exaggerated but common lament in the business community today is that nobody is making money on the Internet.

SUMMARY OF THE INVENTION

The present invention is based, in part, on a recognition that the Internet as a medium is intrinsically different from traditional media in ways that demand new business approaches. In particular, conventional advertising techniques largely ignore the interactive basis of the Internet and are therefore subject to certain pitfalls and/or fail to take advantage of certain opportunities of the interactive environment. Examples of business factors peculiar to this interactive environment include the following:

users who select to participate in the Internet medium tend to be interested in retaining control over their Internet sessions and, therefore, often ignore and even resent advertisements that are pushed onto their desktops and interrupt their sessions or intrude on their desktop areas;

although attempts have been made, with some success, to convert the Internet medium to a push medium, content is not typically broadcast over the Internet, but rather, is usually pulled down or retrieved by identifiable users; and the interactive nature of Internet communications results in waiting times associated with data transmission where the user may be more readily engaged in a manner that is unobtrusive.

These and other factors of the interactive environment are an important basis of the present invention.

According to one aspect of the present invention, selected messages are provided at a user node during a waiting time of an Internet session. The messages can be, for example, promotional or advertising content, product information, a public service announcement or other messages of possible interest to the user. The associated process involves providing a selection of messages, monitoring a user node during an Internet session to identify a web site access request, selecting a message from the selection of messages and displaying the message at the user node during a waiting time related to the web site access request. The waiting time relates to a time interval during which the user node communicates with a server of the requested site and associated set up periods. Preferably, the waiting time during which messages are displayed fall within the time period beginning when the user selects a site and ending upon initiation of site display on the user's desktop. The selection of messages is preferably provided by storing the selection at the user node, e.g, on the user's hard drive or in cache, in a local area network of the user, or otherwise in storage accessible by the user without Internet communication. This selection is stored, for example, prior to an Internet session or as an explicit or background function of a browser service or searching engine during an Internet session. A selection may be stored only for use during a particular session or may be saved for use in subsequent sessions.

The web site access request can be identified in a variety of ways. For example, operating system messages may be monitored to identify a "mouse down" message having desktop coordinates corresponding to a hot link area of the desktop. Keyboard messages may be monitored to identify entry of a URL address or the like. Alternatively, protocol communications such as TCP/IP or HTTP communications of the browser may be monitored to identify a header message associated with a site access request. Upon identifying such an access request, a message can be selected and played at the user node. The message may be selected automatically by logic implementing the process of the present invention, or the user may be allowed to select from message choices, e.g., displayed in a menu or graphically presented in the format of a room or gallery through which the user may peruse.

According to another aspect of the present invention, waiting time messages are terminated at the end of the waiting time so as to minimize Internet session intrusion. The associated process involves providing a waiting time message such as described above, monitoring communications relating to loading of a requested web site to identify a selected status relative to the loading, and terminating playback of the waiting time message based on the identified status. In one implementation, the monitored communications are protocol or other communications between a browser and a server of the selected web site. Alternatively, operation of the browser may be monitored to obtain an indication relating to loading status. As a further alternative, operating system messages may be monitored relative to web site display status. Playback of the waiting time messages can be terminated, for example, upon receiving an indication that a web site page is ready for preliminary, intermediate or complete display. In this regard, the user can preferably set the message program so that messages terminate when loading reaches a selected level, e.g., 25%, 50%, or 100% complete.

According to another aspect of the present invention, waiting time messages are selected based on user information. Preferably such user information is obtained by voluntary participation of the user. Credit towards free Internet access time or other value may be provided as an incentive to and reward for user participation. For example, the user may provide information relative to the demographics, psychographics, product interests and lifestyle of the user upon registering to participate in a waiting time message program. Such information may have already been made available by the user at a separate registration site. Alternatively, information regarding the user may be obtained based on a site access request, a history of Internet usage, or other information that may be derived by monitoring the user node. Additionally, stored user information may be continuously or periodically updated (information and messages may be added and/or deleted) based on a learning process implemented by intelligent code based on Internet usage patterns or the like. Such user information can be employed to tailor the selected waiting time messages to the user's likely interests, thereby enhancing user engagement and enjoyment as well as improving advertisement response rates.

According to yet another aspect of the present invention, waiting time messages are selected, at least in part, on the basis of the anticipated duration of the waiting time. It will be appreciated that the length of the waiting time will vary depending upon, inter alia, the speed of the web site server, the amount of information to be loaded, the congestion of the Internet and the associated configuration of the path from the web site to the user node, the nature and bandwidth of the legs of the communication path between the server and the user node, the communications network selected, the speed of the user node processor, and the operating parameters of the browser or other services involved in server/user communications. Some or all of these factors may be taken into account in estimating waiting time. A waiting time message or messages are preferably selected based on anticipated waiting time to increase message effectiveness and user enjoyment. For example, a short message may be displayed or played where the waiting time is expected to be of short duration and a room or gallery of messages may be made available in the case of a longer waiting period.

The present invention thus provides advertising or other content in an unobtrusive manner. It is believed that such content will more readily engage and entertain users and, therefore, will be more effective. Moreover, such content will not interrupt or distract from Internet sessions, can be tailored to the user's interests, and may inure to the user's benefit and, therefore, should be more acceptable to users and Internet service providers.

BRIEF DESCRIPTION OF THE DRAWINGS

For a more complete understanding of the present invention and further advantages thereof, reference is now made to the following detailed description taken in conjunction with the drawings in which.

SUMMARY OF THE INVENTION

In the following description, the invention is set forth with respect to certain illustrative processes for providing selected waiting time messages in connection with Internet sessions. An exemplary communications network in which the present invention may be implemented is described first. Thereafter, the illustrative processes of the present invention will be described in the context of the communications network. It will be appreciated that specific examples are included in the following description for purposes of clarity, but various details can be changed within the scope of the present invention.

Figure 1:
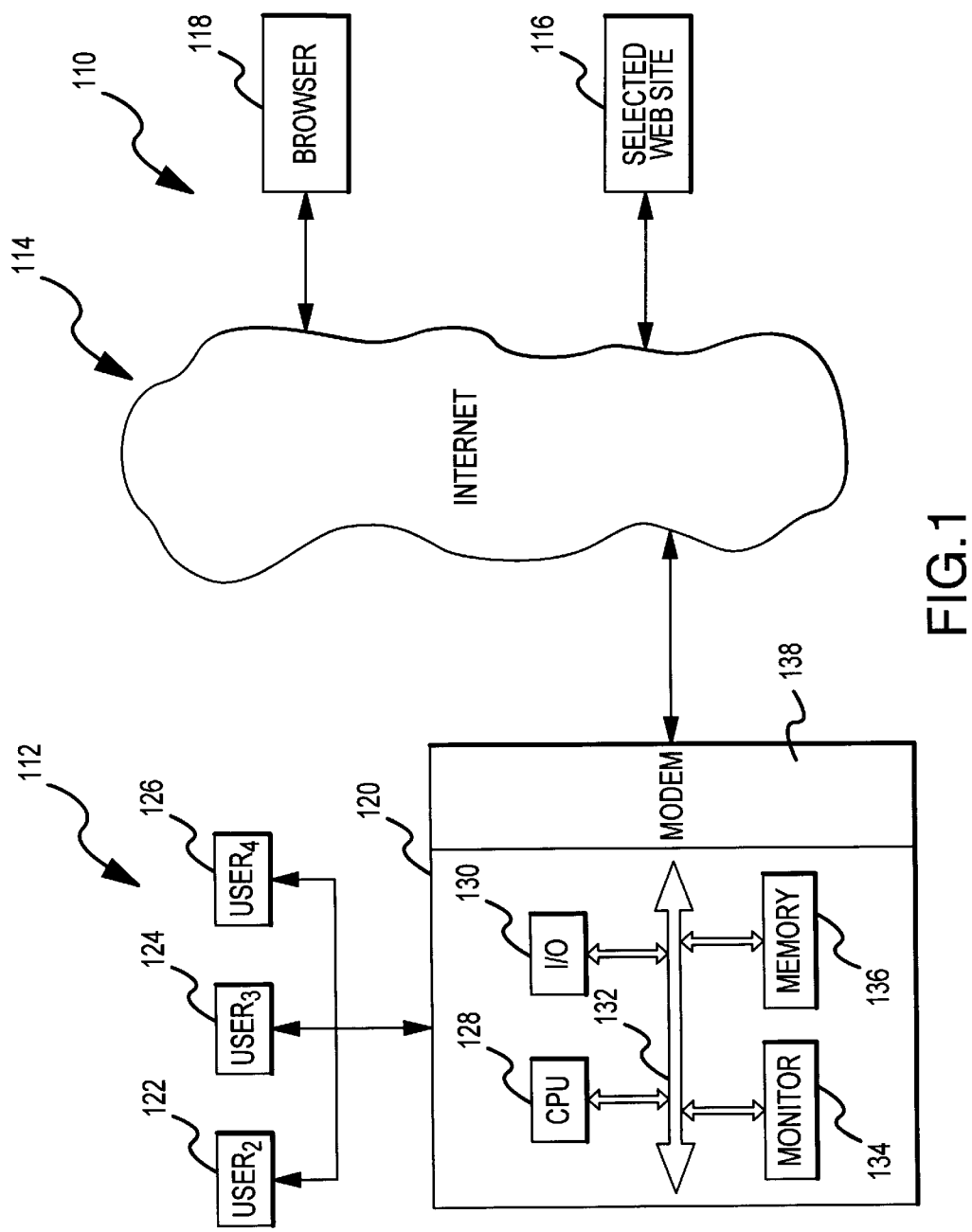
FIG. 1 is a schematic diagram of a communications network in accordance with the present invention.

Referring to FIG. 1, a communications network in which the present invention may be implemented is generally identified by the reference numeral 110. The network 110 includes a user node 112, a selected web site 116, and a browser 118 that communicate via the Internet 114. The selected web site 116 may be any web site associated with the Internet 114. The browser web site 118, may be the site of any suitable browser service such as Netscape Navigator by Netscape Communications, Inc., Internet Explorer by Microsoft Corporation or the like. As will be appreciated, the browser service associated with browser site 118 may be used to directly access selected web site 116, e.g., by entering the web site's URL, or a search engine may be used to identify and access the selected web site 116, e.g., ALTAVISTA, YAHOO, LYCOS, INFOSEEK, EXCITE, etc.

As is well known, the Internet 114 is composed of a variety of network components including packet switched network systems, high speed dedicated lines, 56/64 kbps lines, etc. The user node 112 is connected to the browser web site 118 and the selected web site 116 via a virtual circuit within the Internet 114. That is, the Internet 114 may include a preferred route for making such connections, but such routes can be dynamically reconfigured depending on operating conditions such as Internet traffic and the bandwidth of particular legs of the route. Such reconfiguring may be initiated, for example, if waiting queues associated with particular packet switched network systems are full.

The user node 112 may be a single computer, a local area network or other arrangement of computers that communicate without accessing the Internet. In the illustrated embodiment, the user node 112 includes, for purposes of illustration, four users 120–126. For the present purposes only user one 120 is illustrated in detail. As shown, user one 120 is a computer system including input/output ("I/O") components 130, a central processing unit ("CPU") 128, a monitor 134, and computer memory 136 interconnected by way of data bus 132. The I/O components 130 may include, for example, a mouse, keyboard and/or similar user interface devices. User One 120 is further shown as including a modem 138 for allowing communication across the communications network 110. It will thus be appreciated that user node 112 constitutes an Internet access site.

Figure 2:
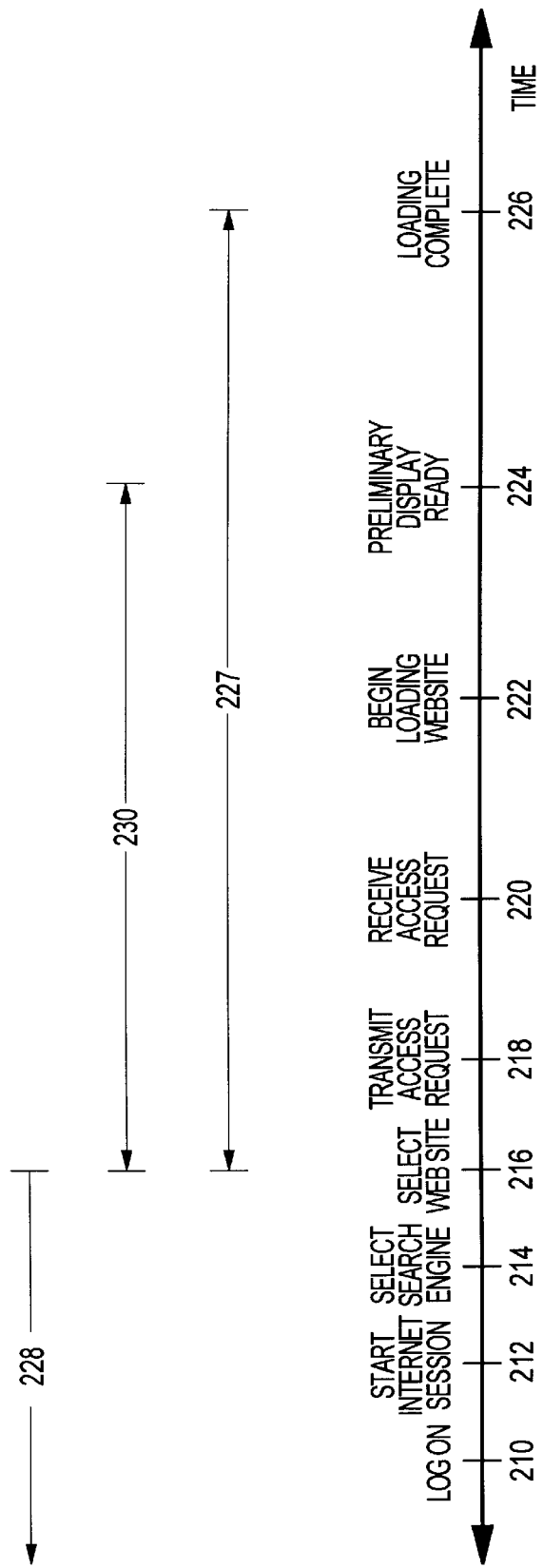
FIG. 2 is a time line illustrating a typical Internet session.

Referring to FIG. 2., a time line for a typical Internet session is shown. It will be appreciated that certain events shown on the time line may be omitted or reordered and the time intervals between events may vary. The illustrated session is initiated by the user by logging on (210) to a computer at the user node. After logging on to the computer, the user accesses (212) the Internet, for example, by using a mouse to click on a browser hot link icon. In response to such selection of the browser icon, the user node contacts the browser web site server and the browser software is activated, and an Internet session is initiated. The user may then use the browser to select (214) a search engine to locate a web site or information located on a web site. Once a web site of interest is identified, the user selects (216) the web site, e.g., using the mouse to activate hot link icon of the web site. A resulting access request is transmitted (218) from the browser to the selected web site. It will be appreciated that the communications between the browser and web site are conventionally conducted in accordance with standard communications protocols such as TCP/IP, HTTP or the like. Such protocols may define the format, sequencing, functionality and other aspects of the messages between the browser and the selected web site to establish communication and effect loading of web site information on the user node. In accordance with such protocol, the access request is received (220) by the server of the selected web site and loading of web site information begins (222).

At some point after loading of the web site information has begun, the desired web site page will be ready for display on the user node monitor. The timing of such display is determined by algorithms implemented by browser logic that determines the order of events relative to the loading process and by the nature of the web site's architecture. As will be appreciated, the desired web site page may be completely downloaded prior to display or portions of the desired page may be preliminarily displayed while loading continues. The time period (227) between web site selection (216) and completion of web site loading (226) may range from a few seconds to several minutes depending on a number of factors as discussed in more detail below.

The illustrated implementation of the present invention involves displaying or playing messages during the waiting period between site selection and web site page display. The messages as well as the logic or program for operating the messages may be downloaded via the Internet or provided on a storage medium to the user. In the case of downloading, the messages and logic may be provided by a browser, search engine or other service provider on its web site. The preferred implementation of the present invention involves downloading a collection or set of messages to the user node and selecting particular messages from this set to be displayed during a waiting time associated with loading of the web site. As shown in FIG. 2, the preferred time period (228) for downloading the message set occurs prior to web site selection (216). In this manner, user node resources remain fully available for use in loading the selected web site information. The message set may be downloaded during the Internet session or may be stored during one Internet session for use in a subsequent Internet session. Indeed, the message set, or at least a base message set, may be loaded long before a given Internet session. The base set may be continuously or periodically updated (messages may be added and/or deleted) by intelligent code based on Internet usage patterns or other acquired user information. Alternatively, the message set may be loaded onto the user site other than by downloading from the Internet, e.g., from a disk or other storage unit.

The preferred message display or playback period (230) occurs during the waiting time between web site selection (216) and the initiation of web site page display (224). Conventionally, during this waiting time period, the user node monitor is inactive except for certain cues to indicate that loading is in progress and, perhaps, indicating the status of the loading process (e.g., indicating the percentage of loading that is complete and the size of the file or other data unit being downloaded). It will therefore be appreciated that the time period utilized to display messages according to the preferred implementation of the present invention is time that would otherwise be essentially wasted from the ordinary user's perspective. For this reason, it is anticipated that user's will be receptive to viewing messages at this time. Such messages may include advertising and promotional messages, product information, public service messages or various other messages.

Figure 3:
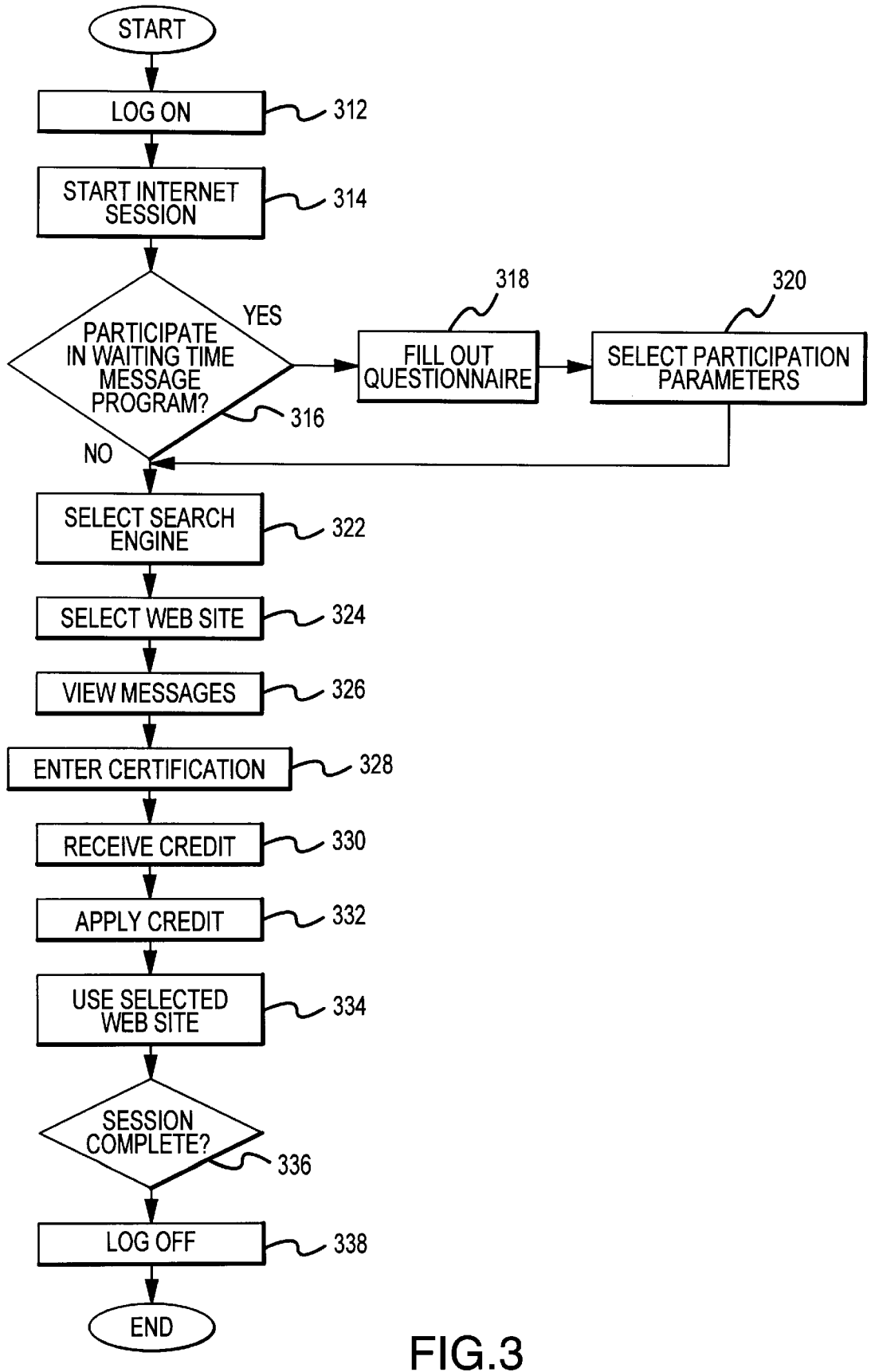
FIG. 3 is a flow chart illustrating a process implemented by a Internet user in accordance with the present invention.

FIG. 3 illustrates a user implemented process in accordance with the present invention. The process in initiated by logging on (312) at the user node and starting (314) an Internet session as described above. In the illustrated process, the user is allowed to elect (316) whether to participate in the waiting time message program of the present invention. The user may elect to participate in the program, for example, by responding to an appropriate prompt provided in connection with the browser, search engine or other Internet service. For example, such a prompt may be available on a home page of the server site associated with such a service. If the user elects to participate in the program, the user may further agree to provide user information that can be used to tailor the user message set to the user's interests. For example, the message set may be selected based on demographic, psychographic or product interest preferences of the user. Such information may be obtained from a web site or other database where such information is stored for the user. Alternatively, such information may be obtained by way of filling out (318) a questionnaire provided in conjunction with the waiting time message program. For example, the questionnaire may elicit information regarding the user's age, product preference, lifestyle, income and the like. Additionally, the illustrated waiting time message program allows the user to select (320) program participation parameters. In this regard, for example, the user may wish to indicate a different message preference matrix (e.g., travel and leisure, public service or product information) for different Internet sessions. Similarly, the user may set a specific loading state where waiting time messages are to be terminated, e.g., 25%, 50%, 75% or 100% complete.

After the user has completed entry of such user information, the user may proceed to select (322) a search engine, and sclect (324) a web site of interest. While the user waits for the selected web site to be loaded, the waiting time message program selects messages in accordance with the user information (if applicable) and the selected messages are viewed (326) by the user. The program may also provide messages as a screen saver function during periods of inactivity.

Especially in cases where the waiting time message program is offered in conjunction with browser, search engine or other Internet services, the service provider may provide an incentive program to encourage participation in the waiting time message program. For example, a frequent use program may be offered to encourage and reward participation by providing credits towards free Internet access or other value based on the number or duration of messages viewed. In order to track such usage, the user may be required to enter (328) certification information in conjunction with viewing messages. Such certification information may be entered, for example, by responding to appropriate prompts provided during or after messages. Alternatively, such credits may be awarded automatically. The user then receives (330) credit for viewing the messages which may be applied (332) towards the incentive program. For example, the credit may be applied towards paying subscription fees or collected for application towards other items offered as part of the incentive program. It will thus be appreciated that use is monitored by an authentication system at a central site such as the site of an Internet service provider. The authentication system employs a usage credit counter to monitor usage. In addition to tracking usage for the incentive program, the records accumulated by the authentication system will assist advertisers in tracking advertisement usage. Once the selected web site is loaded and the waiting time messages are terminated, the user may use (334) the selected web site in conventional fashion. Upon completing use of the selected web site, if the Internet session is completed (336), the user logs off (338) the Internet. Otherwise, the user selects (324) a further web site page and the process is repeated. If the user moves to a page that is stored in cache (e.g., by using forward or back function), display will be essentially instantaneous and the message program will not be implicated. However, if the new site request requires Internet access and a delay is involved, messages will be provided.

Figure 4:
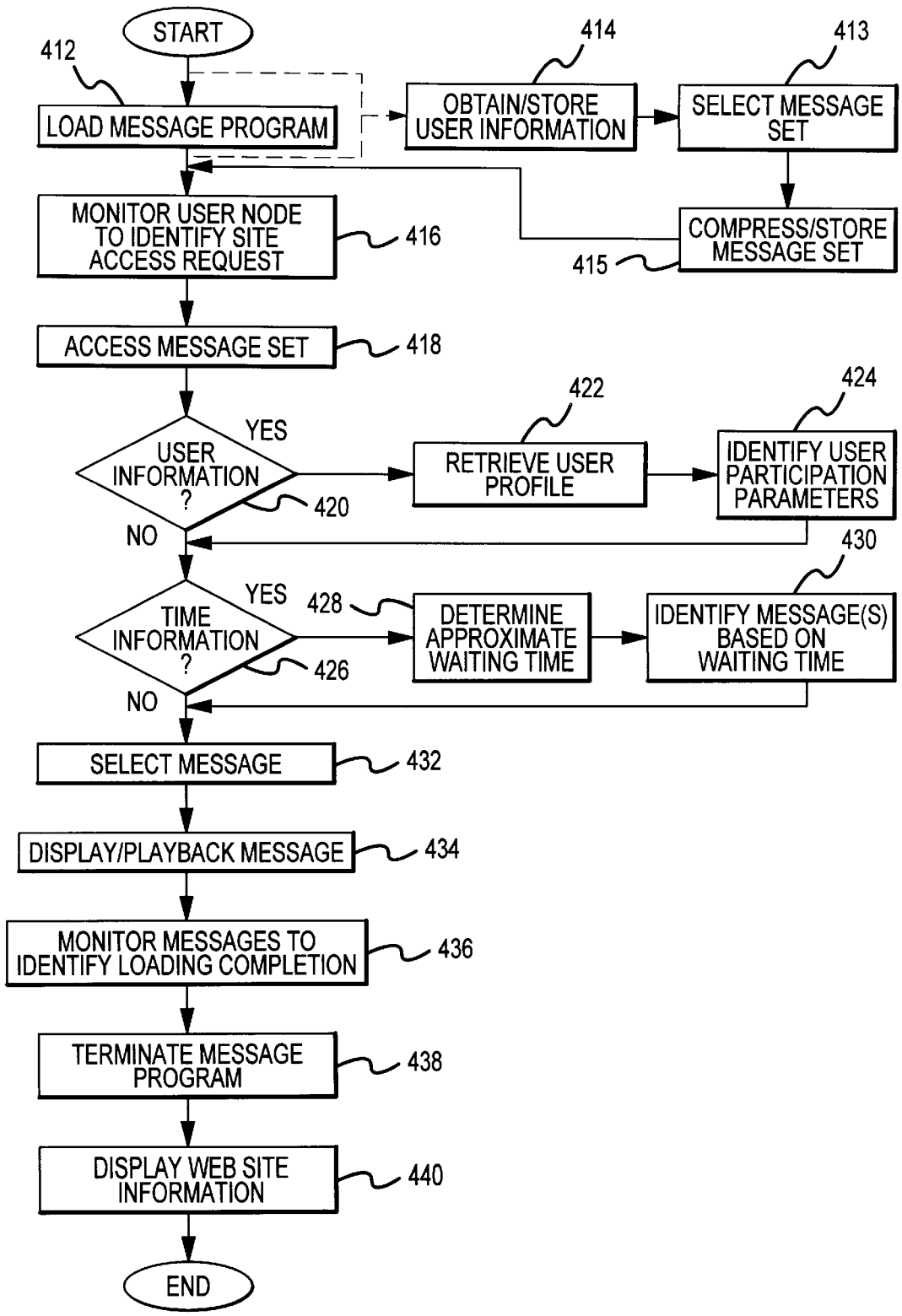
FIG. 4 is a flow chart illustrating a process implemented by a waiting time message program in accordance with the present invention.

FIG. 4 is a flow chart illustrating operation of the waiting time message program. The program may be executed, for example, on the CPU of the user node and may be loaded (412) at log on or at the start of Internet session. As indicated in FIG. 4, user information may be obtained and stored (414) prior to or after loading of the program. As previously noted, the user information may be obtained from a separate web site or may be obtained by way of a questionnaire implemented by the program. The user information is preferably stored in computer memory at the user node (on the users computer, on another computer in the user's local area network, or otherwise stored for retrieval without accessing the Internet. Based on the user information, the program selects (413) a message set by employing algorithms for deriving demographic, psychographic, lifestyle or other information based on the user information and retrieves a corresponding message set. The message set is then compressed (415) for compact storage at the user node.

During an Internet session, the program monitors (416) the user node to identify a site access request. The site access request may be identified by reference to a header message of a protocol communication between the browser and the selected web site. Alternatively, the site access request may be identified by monitoring operating system messages or by identifying a URL entry via a keyboard. Upon identifying a site access request, the program accesses (418) the message set is stored, for example, on the user's hard drive or in cache. The program may select (432) a message from the message set based on user information, information regarding the expected duration of the waiting time, both, or neither. If user information is to be utilized (420) the program retrieves (422) a user profile. The user profile is preferably based on user information voluntarily entered by the user as described above. Alternatively, user information may be derived, for example, based on the selected web site, a history of selected web sites during the current Internet session and/or previous sessions or based on other information obtained by monitoring the user node. In addition, the program may identify (424) user participation parameters entered by the user as described above.

If time information is to be utilized (426) the program determines (428) the approximate waiting time associated with a particular web site access request. The approximate waiting time depends on a number of factors including the speed of the server at the selected web site, the level of congestion on the Internet and any rerouting required by such congestion, the bandwidth of each leg of the route between the selected web site and the user node, the processing speed of the user node, the operation of the browser, and the size and number of files that are downloaded before display can begin. Ideally, as many of these factors as possible should be taken into account in determining the approximate waiting time. For example, the headers of protocol communications between the browser and the selected web site convey information regarding the quantity of information that is to be downloaded. Such data is commonly used to provide displays during loading such as "15% of 7K" or the like. This information can used to gain some information regarding the approximate waiting time, although it will be appreciated that actual waiting time may be longer than expected as multiple files may be linked by tags, i.e., a message embedded in one file may direct the browser to access another file at the selected web site. The program can use such file size information together with information regarding the speed of the user node processor, the operation of the browser and empirical data gained through experience to approximate the waiting time and identify (430) messages to be displayed or played during the waiting time. Additionally, information regarding the expected waiting time and regarding the fastest communication network at the current time may be obtained by "pinging" one or more communications networks, e.g., issuing network access requests to the network(s) and measuring the response time for receiving a responsive signal.

The corresponding messages are then selected (432) by the program and displayed or played back (434). During the waiting time, the program monitors (436) messages to identify an indication that loading is complete or has reached a level selected by the user as a participation parameter. Such an indication may be provided, for example, by way of a message from the browser to the operating system to initiate the display or by monitoring the loading status. Upon identifying such a message, the program terminates (438) the waiting time messages and the user node proceeds to display (440) the web site information as usual. In this manner, the messages are provided only during the waiting time and do not delay or interfere with the user's Internet session.

While various implementations of the present invention have been described in detail, it is apparent that further modifications and adaptions of the invention will occur to those skilled in the art. However, it is to be expressly understood that such modifications and adaptions are within the spirit and scope of the present invention.

What is claimed is:

1. A process for providing selected content during a waiting time of an Internet session, comprising the steps of:

providing a selection of messages;

monitoring a user node during an Internet session to identify a web site access request, and selecting, in response to an identified web site access request, a message from said plurality of messages and playing the selected message at the user node during a waiting time associated with processing said web site access request;

said step of selecting comprising identifying said message based on user information, said user information being specific to a user of said user node, being voluntarily made available by said user and having a content that is independent of network usage history.

2. A process as set forth in claim 1, wherein said step of providing a selection comprises providing at least one of promotional information or advertising, product information, and public service messages.

3. A process as set forth in claim 1, wherein said step of monitoring a user node comprises monitoring at least one computer located at said user node.

4. A method as set forth in claim 1, wherein said step of monitoring comprises identifying a user input relative to said website access request.

5. A method as set forth in claim 4, wherein said user input comprises a signal relative to a mouse input.

6. A process as set forth in claim 4, wherein said user input comprises a signal relative to a keyboard input.

7. A method as set forth in claim 1, wherein said step of monitoring comprises monitoring protocol communications associated with accessing a selected website.

8. A process as set forth in claim 1, wherein said user information comprises one of demographic, psychographic, product interest or lifestyle information regarding said user.

9. A process as set forth in claim 1, wherein said user information is obtained based on data entered by said user.

10. A process as set forth in claim 1, wherein said user information is obtained based on prior Internet usage by said user.

11. A process as set forth in claim 1, wherein said step of selecting a message comprises displaying selection options to said user, receiving a selection input from said user, and selecting said message based on said selection input.

12. A process as set forth in claim 1, wherein said user information is obtained from a separate registration site accessible via the Internet.

13. A process as set forth in claim 1, wherein said step of providing a selection of messages comprises updating a previously provided selection of messages.

14. A process as set forth in claim 1, wherein said step of selecting a message comprises selecting said message based on an anticipated duration of said waiting time.

15. A process as set forth in claim 14, wherein said anticipated duration is determined based on an amount of information to be loaded from a selected website to said user node.

16. A process as set forth in claim 14, wherein said anticipated duration is determined based on a parameter relative to a speed of obtaining information from a selected website to said user node.

17. A method as set forth in claim 1, wherein said step of playing comprises playing said selected message at a time between selection of a website and initiation of display of said website at said user node.

18. A process as set forth in claim 1, wherein said step of playing the selected message comprises playing said message during a processing time associated with an exchange of information between a website and said user node associated with loading of at least one website page.

19. A process as set forth in claim 1, further comprising the step of storing said selection of messages at said user node.

20. A process as set forth in claim 19, wherein said step of storing comprises providing said selection of messages at a location accessible by a user at said user node substantially free from Internet communication.

21. A process as set forth in claim 19, wherein said step of storing comprises storing said selection of messages prior to an Internet session during which said selected message is played.

22. A process as set forth in claim 19, wherein said step of storing comprises loading said selection of messages onto said user node as a background function during an Internet session.

23. A process as set forth in claim 1, further comprising the step of terminating message playback based on a selected status relative to loading of information from a selected website to said user node.

24. A process as set forth in claim 23, wherein said step of terminating comprises monitoring messages of one of a browser and a user node operating system to obtain an indication that said selected status has been achieved.

25. A process as set forth in claim 23, wherein said step of terminating comprises receiving an indication that a website page is ready for preliminary display.

26. A process as set forth in claim 23, wherein said step of terminating comprises receiving an indication that said loading has reached a selected level relative to completion of a loading process.

27. A process as set forth in claim 1, further comprising the step of receiving a certification from a user indicating that the user has viewed said selected message, wherein said certification allows for tracking of message usage.

28. A process as set forth in claim 1, further comprising the step of providing an incentive to encourage viewing of said messages by a user, wherein value is provided to a user based quantity of viewed messages.

* * * * *